(12) United States Patent
Foote

(10) Patent No.: US 6,662,655 B2
(45) Date of Patent: Dec. 16, 2003

(54) NET ZERO ISOLATOR

(75) Inventor: Steven A. Foote, Issaquah, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/002,192

(22) Filed: Oct. 31, 2001

(65) Prior Publication Data

US 2002/0050167 A1 May 2, 2002

Related U.S. Application Data

(60) Provisional application No. 60/244,824, filed on Oct. 31, 2000.

(51) Int. Cl.⁷ .............................................. G01P 15/10
(52) U.S. Cl. ...................... 73/493; 73/514.29; 248/604
(58) Field of Search ........................ 73/514.29, 514.36, 73/514.01, 493, 497, 862.59, 756; 248/560, 634, 603, 604

(56) References Cited

U.S. PATENT DOCUMENTS 4,926,689 A * 5/1990 Hanson ........................ 73/497
5,594,170 A * 1/1997 Peters ..................... 73/514.29

* cited by examiner

Primary Examiner—John E. Chapman
(74) Attorney, Agent, or Firm—Charles J. Rupnick

(57) ABSTRACT

A net zero isolator having an elongated linear displacement member; and first and second counter rotation members arranged crosswise to the linear displacement member at either end thereof, each of the first and second counter rotation members including a mounting portion spaced apart from an isolated portion on respective first and second sides of the elongated linear displacement member. The elongated linear displacement member and the first and second counter rotation members are structured such that a displacement of the mounting portions along the linear displacement member is balanced by a displacement of the isolated pads. The net zero isolator acts through each of the first and second counter rotation members to generate displacements of the isolated portions that cancel a linear displacement of the mounting portions.

62 Claims, 6 Drawing Sheets

NET ZERO ISOLATOR

This application claims the benefit of U.S. Provisional Application Ser. No. 60/244,824 filed in the name of Steven A. Foote on Oct. 31, 2000, the complete disclosure of which is incorporated herein by reference.

FIELD OF THE INVENTION

The present invention relates to accelerometers, and in particular to structures for mounting the same, whereby external stress sources are isolated from active accelerometer components.

BACKGROUND OF THE INVENTION

Accelerometers generally measure acceleration forces applied to a body. Accelerometers are typically mounted directly onto a surface of the accelerated body. Such direct mounting ensures the immediate detection of even subtle forces exerted on the body. The directly mounted accelerometer is, however, also exposed to various extraneous shock, vibration and thermal stresses experienced by the accelerated body. The accelerometer measures the forces induced by such external stresses in combination with the applied acceleration forces and renders confused and inaccurate acceleration measurements. Generally, isolation mechanisms between the accelerometer and the accelerated body are typically integrated into the accelerometer housing to protect the accelerometer from forces induced by stresses within the accelerated body.

Additionally, sensitive accelerometers can suffer from error sources caused by subtle forces induced by stresses internal to the accelerometer but external to the acceleration sensing mechanism. In monolithic micro-machined accelerometers having vibrating beam force detectors suspended between a movable proof mass and an accelerometer frame, such forces are caused by, for example, mounting stresses between a silicon cover plate and the sensor frame or other assembly stresses. Other such stresses include, for example, thermal stresses resulting from a mismatch of thermal expansion coefficients between materials within the sensor. External thermal stresses may be induced by the typical mechanical coupling of the sensor frame to the silicon cover plate and by the mechanical coupling of the silicon cover plate to a ceramic or metal mounting plate. Since the cover and mounting plates are typically fabricated of materials different from the sensor frame, they usually have substantially different coefficients of thermal expansion. When operated at elevated temperatures, the mismatch in thermal expansion coefficients generally causes undesirable stresses which induce distortion and strain in the sensor frame.

Bias performance and stability of monolithic silicon-based accelerometers is based on proof mass sizing, commonly referred to as pendulousity, and on the degree of stress isolation in the mechanical die stack. Monolithic micro-machined vibrating beam accelerometers are typically targeted for small size which limits the proof mass size and generally requires special care in providing isolation from external stresses. Historically, the accelerometer frame is suspended from a second outer frame by flexures that permit the accelerometer frame to move relative to the outer frame, as shown and described in allowed U.S. patent application Ser. No. 08/735,299, now U.S. Pat. No. 5,948,981 to Woodruff entitled, VIBRATING BEAM ACCELEROMETER, issued Sep. 7, 1999. Such isolation structure designs as have been possible using a potassium hydroxide (KOH) etching solution in a bulk process to cost effectively fabricate monolithic micro-machined vibrating beam accelerometers effectively minimize the distortion of the accelerometer frame and decrease the effects of the thermal coefficient mismatch. However, the orientation of the natural etch planes in silicon at 57.4 degrees from vertical using a KOH etching solution requires relatively large amounts of physical space, thus limiting both the pendulousity, i.e., possible proof mass size, and the possible isolation structure designs and requiring major compromises and trade-offs in proof mass sizing and isolation structure design in very small applications.

In prior art devices, the flexures that suspend the accelerometer frame from the second outer frame are commonly compliant beam or spring isolators. These compliant beam or spring isolators are used to reduce the stresses caused by mounting displacements to a small value. These isolators obey a simple spring equation, given by:

Force $(F)$=spring constant$(k)$*displacement$(d)$.

Thus, for a given mounting displacement, the force applied to the sensor is reduced through the isolator spring constant, which is designed to be as low as possible. The resulting strain in the sensor is thus reduced through the spring constant of the isolator.

A typical example of such compliant beam or spring isolators is found in the twin beam suspension system illustrated in FIG. 1. The accelerometer illustrated in FIG. 1 has a conventional isolation structure formed of compliant beam or spring isolators embodied as flexures. In FIG. 1 the accelerometer 10 is a miniature structure fabricated from a substrate 12 of semiconductor material by conventional micromachining techniques. The substrate 12 is formed of a monocrystalline silicon material. The silicon substrate 12 often includes an upper silicon or active layer 14 that is electrically isolated from an underlying substrate 16 by an insulating layer 18 or an insulating layer is applied to active layer 14, as shown and described in incorporated U.S. Pat. No. 5,948,981. The insulating layer 18 is may be a thin layer, e.g., about 0.1 to 10.0 micrometers, of oxide, such as silicon oxide. The silicon substrate 12 is usually formed by oxidizing active layer 14 and underlying substrate 16, and adhering the two layers together. A portion of active layer 14 may be removed to bring the layer 14 to the desired thickness. The silicon oxide layer 18 retains its insulating properties over a wide temperature range to ensure effective mechanical resonator performance at high operating temperatures on the order of 100 degrees Celsius. In addition, the insulating layer 18 inhibits undesirable etching of the active layer 14 during etching.

The accelerometer 10 includes an acceleration sensor mechanism 20 having one or more flexures 22 pliantly suspending a proof mass 24 from a sensor frame or plate 26 for movement of the proof mass 24 along an input axis I normal to the proof mass 24. The flexures 22 are preferably etched near or at the center of the underlying substrate 16, i.e., substantially centered between the opposing upper and lower surfaces of the underlying substrate 16. Optionally, the flexures 22 are formed by anistropically etching in a suitable etchant, such as potassium hydroxide (KOH). The flexures 22 define a hinge axis H about which the proof mass 24 moves in response to an applied force, such as the acceleration of the accelerated body, for example, a vehicle, aircraft or other moving body having the accelerometer 10 mounted thereon. The sensor mechanism 20 includes a pair of mechanical resonators 28 formed from the active silicon layer 14 and coupled between the proof mass 24 and the sensor plate 26 for measuring forces applied to the proof mass 24. An oscillator circuit (not shown) drives the mechanical resonators 28 at their resonance frequency. In response to an applied force, the proof mass 24 rotates about the hinge axis H, causing axial forces, either compressive or tensile, to be applied to the mechanical resonators 28. The axial forces change the frequency of vibration of the mechanical resonators 28, and the magnitude of this change serves as a measure of the applied force or acceleration.

External stresses and strains may be induced in the sensitive acceleration sensor mechanism 20 by, for example, the typical mechanical coupling of the accelerometer sensor plate 26 to a silicon cover plate 30. The silicon cover plate 30 is in turn typically connected to a ceramic or metal mounting plate 32. Since the mounting 32 and cover plates 30 are fabricated from different materials, they will usually have substantially different coefficients of thermal expansion when cooled or heated during operation. This mismatch in thermal coefficients may cause undesirable stresses and strains at the interface of the inner and cover plates, causing a slight distortion of the sensor plate 26. Other stresses and strains induced in the sensitive acceleration sensing mechanism 10 include, for example, external sources of shock and vibration experienced by the accelerated body and the accelerometer 10. Many methods of isolating the sensor plate 26 from such undesirable stresses and strains are known to those of ordinary skill in the relevant arts. For example, suspending the sensor plate 26 from a second outer or external frame 34 by flexures 36 formed by overlapping slots 38 and 40 through the substrate 12. The sensor plate 26 is thus able to move relative to the outer frame 34, as shown and described in U.S. Pat. No. 5,948,981, which is assigned to the assignee of the present application and is incorporated herein by reference. Such isolation minimizes the distortion of the sensor plate 26, and thereby decreases the effects of thermal mismatching on the mechanical resonators 28.

The prior isolation approach illustrated in FIG. 1 suffers limitations. While the stress and resulting strain imposed on the sensitive acceleration sensor mechanism 20 may be substantially reduced, they are never completely eliminated. Much effort is generally required to find a "best support location" or "best configuration" such that the impact to the sensor mechanism 20 is minimized. Also, the compliance of the isolator, flexures 36 in the device of FIG. 1, introduces a lower frequency resonance condition into the accelerometer system. This lower frequency resonance condition is problematic in most practical applications because practical applications generally require resonances that are as high a frequency as possible to ensure accurate acceleration measurements.

In any practical suspension system design the requirement to isolate the sensor mechanism from external stresses is in opposition with the requirement to ensure accurate acceleration measurements. In practical sensors the need to keep resonant frequencies high limits the compliance of the isolation beams or flexures, and therefore, limits the isolation that can be obtained with normal compliant spring isolators.

SUMMARY OF THE INVENTION

The present invention overcomes the accelerometer and proof mass sizing constraints of the prior art by providing a method and apparatus which provide the acceleration sensor device isolation from mounting stress and shock, vibration and thermal stresses experienced by the accelerometer. The method and apparatus of the invention also achieve a rigid isolation structure having a high resonance frequency. The acceleration sensor device of the invention nulls mounting point displacements to zero at sensor support points, and accomplishes this nullification of mounting point displacements with a structure that may be very rigid.

According to one aspect of the invention, a net zero isolator is provided having an elongated displacement reaction member; and first and second counter rotation members arranged crosswise to the displacement reaction member at either end thereof, each of the first and second counter rotation members including a mounting portion spaced apart from an isolated portion on respective first and second sides of the elongated displacement reaction member. The elongated displacement reaction member and the first and second counter rotation members are structured such that a displacement of the mounting portions along the displacement reaction member is balanced by a displacement of the isolated pads. The net zero isolator acts through each of the first and second counter rotation members to generate deflections of the first and second counter rotation members that cancel a linear displacement of the mounting portions at the isolated portions.

According to another aspect of the invention, a two-axis suspension system is provided having a pair of the net zero isolators of the invention combined to provide a stable, two-axis suspension system or sensor platform.

According to still another aspect of the invention, an accelerometer is provided having the acceleration sensor device in combination with a plurality of the net zero isolators of the invention embodied as a two-axis suspension system, whereby the acceleration sensor device is isolated from mounting stress and shock, vibration and thermal stresses experienced by the accelerometer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a monolithic micro-machined vibrating beam accelerometer device and method for manufacturing such a device having the acceleration sensor mechanism de-coupled from stresses experienced by the accelerated body, including vibration, shock and thermal stresses and the stresses resulting from mounting the sensitive acceleration sensor mechanism to the accelerometer outer frame and cover plates.

The present invention includes a suspension member and system that establishes a moment arm around a floating reaction beam rather than the conventional method of depending on highly compliant beams to reduce the force caused by displacement (F=kd). The reaction beam takes the load such that the linear displacement is balanced by a displacement at the null point generated by a moment that acts through a moment arm. The null point is the net zero support for the isolated sensor.

Figure 2:
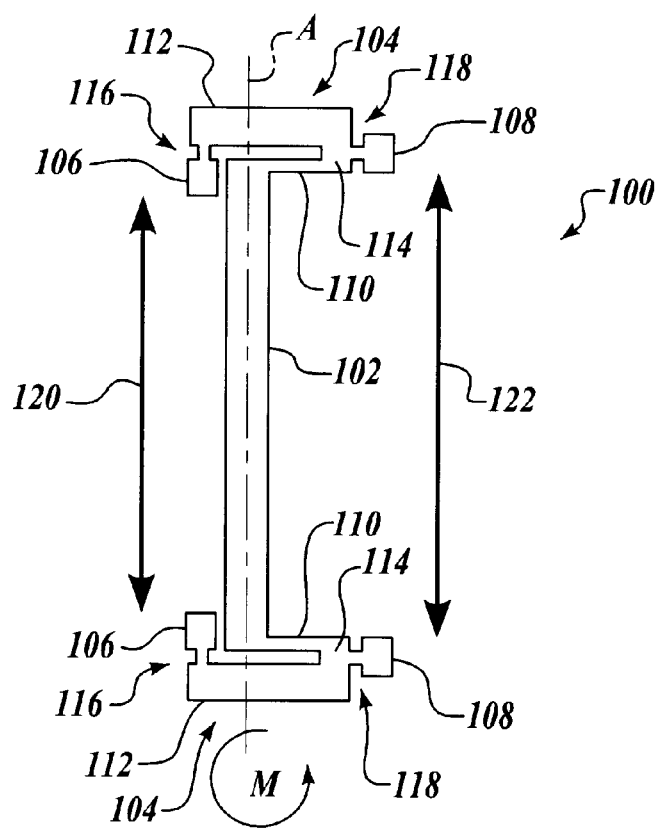
FIG. 2 illustrates the net zero isolator of the invention embodied as a single axis net zero isolator having a linear displacement member floating between a pair of counter rotation members.

FIG. 2 illustrates the net zero isolator of the invention embodied as a single axis net zero isolator 100 formed in a monocrystalline silicon substrate having substantially parallel opposing surfaces. The net zero isolator 100 is illustrated in FIG. 2 as having a linear displacement member 102 floating between a pair of crosswise counter rotation members 104. The linear displacement member 102 is embodied as an elongated reaction beam 102 having a generally rectangular cross-section. As embodied in FIG. 2, the cross-section of the reaction beam 102 is sufficiently large relative to the length that the reaction beam 102 can be treated as a substantially rigid beam.

The single axis net zero isolator 100 illustrated in FIG. 2 includes a pair of counter rotation members 104 positioned crosswise at opposite ends of the reaction beam 102. The two counter rotation members 104 are substantially similarly to one another.

Each counter rotation member 104 each includes a device mounting pad 106 spaced apart from an isolated pad 108. The two device mounting pads 106 are arranged beside the reaction beam 102 and on the same first side of its longitudinal axis A. The two isolated pads 108 are arranged on the other side of the reaction beam 102 on a second side of the longitudinal axis A opposite from the two mounting pads 106 and crosswise to the reaction beam 102. Each counter rotation member 104 includes a relatively slender and flexible or compliant deflection beam 110 in combination with a heavier and more rigid moment arm 112. The relatively compliant deflection beams 110 project crosswise from opposite ends of the reaction beam 102 toward the second side of the longitudinal axis A.

Each of the relatively rigid moment arms 112 is coupled to a respective one of the flexible deflection beams 110 at a junction 114 at an end of the flexible deflection beams 110 that is distal from the reaction beam 102. Each moment arm 112 doubles back along the respective deflection beam 110 spaced a short distance away therefrom. The moment arms 112 are longer than the deflection beams 110 so that each moment arm 112 extends past the reaction beam 102 to the first side of the longitudinal axis A opposite from the deflection beams 110. The two mounting pads 106 extend crosswise from the end of the respective moment arm 112 opposite from the junction 114 between the moment arm 112 and the deflection beam 110. Each of the respective mounting pads 106 is separated from the moment arm 112 by a slender neck portion 116.

Figure 3:
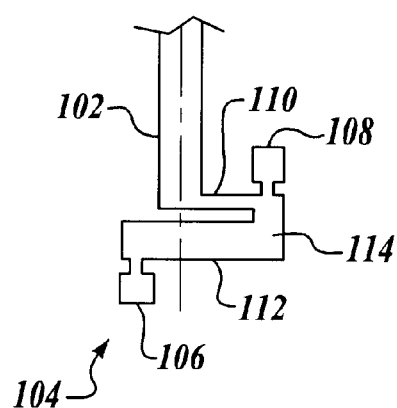
FIG. 3 illustrates the net zero isolator of the invention alternatively embodied as a single axis net zero isolator having the mounting pads directed away from one anther, and the isolated pads directed toward one another.
Figure 4:
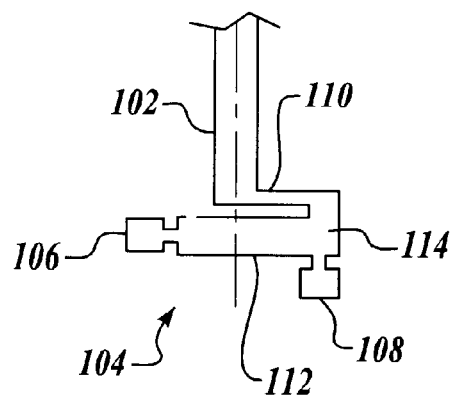
FIG. 4 illustrates the net zero isolator of the invention alternatively embodied as a single axis net zero isolator having the mounting pads directed along the length of the respective moment arm, and the isolated pads aligned with and directed along the length of the reaction beam.

The rotational compliance of the neck portions 116 provide relief for small residual rotations at the moment arm 112, including the junction 114, that would otherwise place a rotational stress on the isolated pads 108. These neck portions 116 essentially provide free pivots or hinges to relieve this stress. The mounting pads 106 thus extend from the moment arm 112 on the second side of the reaction beam 102 opposite from the deflection beam 110. The mounting pads 106 may be arranged substantially aligned with the longitudinal axis A of the reaction beam 102 and directed toward one another, as shown in FIG. 2. Alternatively, the mounting pads 106 are directed away from one another, as shown in FIG. 3. The mounting pads 106 also may be arranged in any other convenient attitude, such as aligned with and directed along the length of the respective moment arm 112, as shown in FIG. 4. Other arrangements of the mounting pads 106 relative to the respective moment arm 112 are also considered equivalent for purposes of practicing the invention.

The isolated pads 108 extend from the junctions 114 of the moment arms 112 and deflection beams 110 at the end of a slender neck portion 118 that separates the isolated pad 108 from the respective moment arm 112 and deflection beam 110. The neck portions 118 operate similarly to the neck portions 116 to provide rotational compliance that relieves small residual rotations at the moment arm 112 and the junctions 114 that would otherwise place a rotational stress on the isolated pads 108. The neck portions 118 thus also provide free pivots or hinges to relieve rotational stresses on the isolated pads 108. The isolated pads 108 may be arranged crosswise to the longitudinal axis A of the reaction beam 102, as shown in FIG. 2. Alternatively, the isolated pads 108 are directed toward one another, as shown in FIG. 3. The isolated pads 108 also may be arranged in any other convenient attitude, such as aligned with the reaction beam 102 and directed away from one another, as shown in FIG. 4. Other arrangements of the isolated pads 108 relative to the respective junction 114 are also considered equivalent for purposes of practicing the invention. Combinations of the arrangements of the mounting pads 106 and isolated pads 108 not shown are provided by the invention and are also considered equivalent for purposes of practicing the invention.

Figure 1:
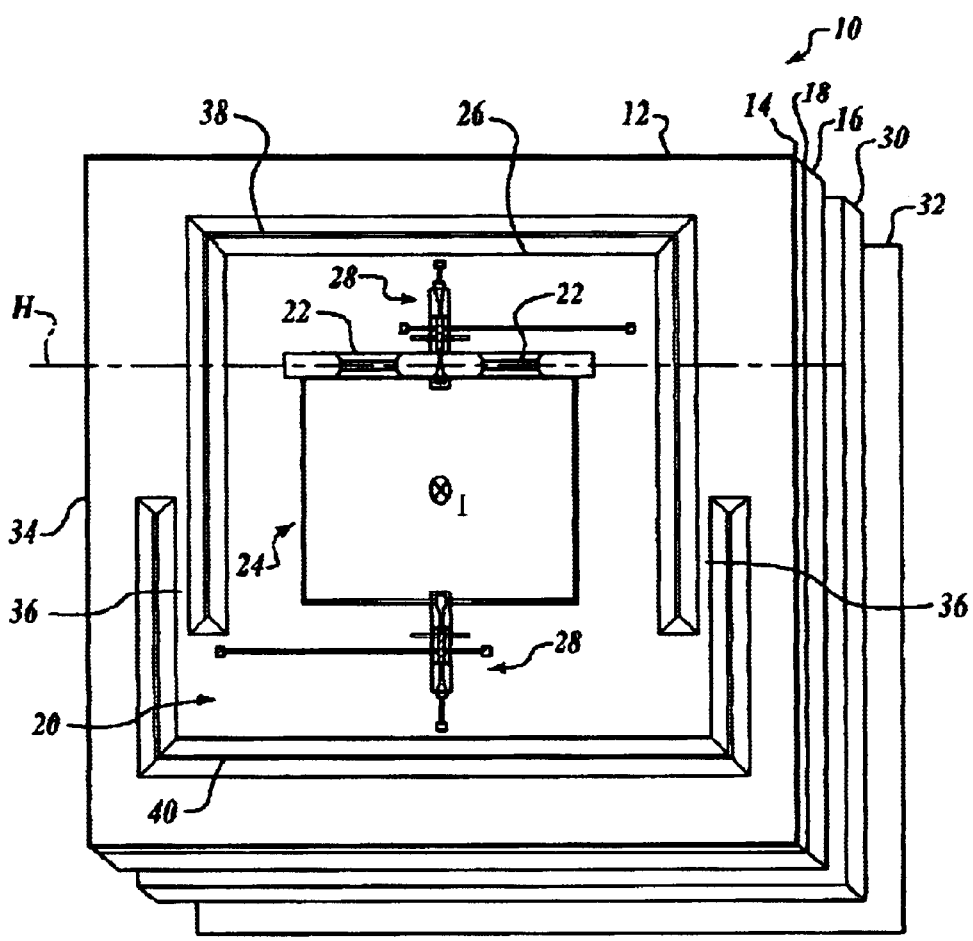
FIG. 1 is an illustration of the isolation structure of the prior art as embodied in an accelerometer.

The single axis net zero isolator 100 embodiment of the invention is mounted by the mounting pads 106 on an accelerometer frame, such as the outer or external frame 34 shown in FIG 1. The sensitive acceleration sensor mechanism 20 is suspended by the sensor plate 26 on the isolated pads 108. Various undesirable external stress are introduced into the mounting pads 106 through the accelerometer frame. These external stresses induce a displacement of the mounting pads 106, as indicated by the arrow 120 shown in FIG. 2. The displacement 120 of the mounting pads 106 applies a force to each of the moment arm 112, the deflection beam 110, and the reaction beam 102. For example, the force applied to the mounting pads 106 by the expansive mounting displacement 120 causes the deflection beams 110 to rotate the respective isolated pads 108 outwardly away from each other, as indicated by the second displacement arrow 122.

However, the force applied to the moment arm 112 is resisted by the reaction beam 102 which produces a moment M as well as the translation force acting along the displacement 120. The moment M is also applied to the deflection beam 110, which causes it to rotate inwardly and to bring the isolated pads 108 closer together. Each of the reaction beam 102, the moment arm 112, and the deflection beam 110 are designed using known mechanical design techniques to have dimensions and compliances that cause the translational deflection 120 of the isolated pads 108 to be equal and opposite the deflection driven by the moment M. The summation at the isolated pads 108 of the translational deflection 120 and the deflection driven by the moment M results in a net zero displacement 122 between the pair of isolated pads 108.

The resultant net zero displacement 122 does not depend on the high compliance of any of the beams involved, the reaction beam 102, the moment arm 112, and the deflection beam 110. Rather, the balance of the opposing effects generates the resultant net zero displacement 122. The net zero isolator 100 therefore may be very stiff relative to conventional isolation systems. Thus, the traditional tradeoff between isolation and the resonant frequency of the isolator is resolved. High resonant frequencies may be obtained, and stress isolation may be improved coincidentally.

Figure 5:
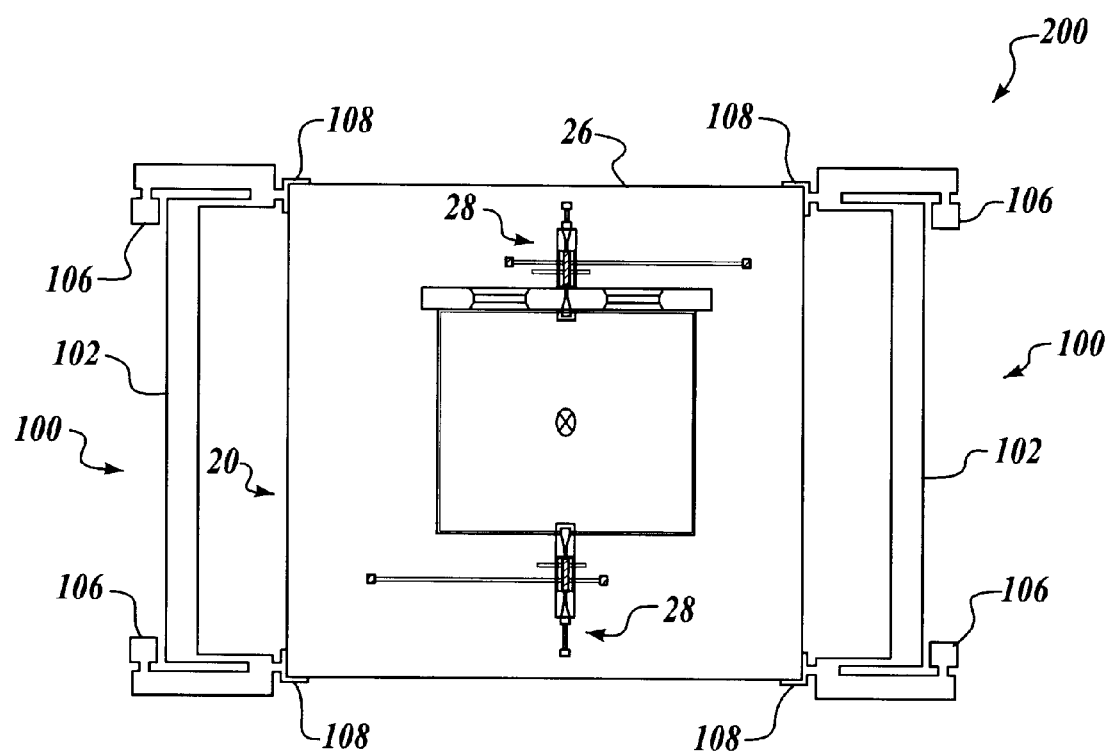
FIG. 5 illustrates the net zero isolator of the invention alternatively embodied as a two-axis suspension system having a pair of the net zero isolators of the invention combined to provide a stable, two-axis suspension system or sensor platform.

FIG. 5 illustrates the net zero isolator of the invention embodied as a two-axis suspension system. In FIG. 5 a pair of the net zero isolators 100 are combined to provide a stable, two-axis suspension system or sensor platform 200.

Figure 7:
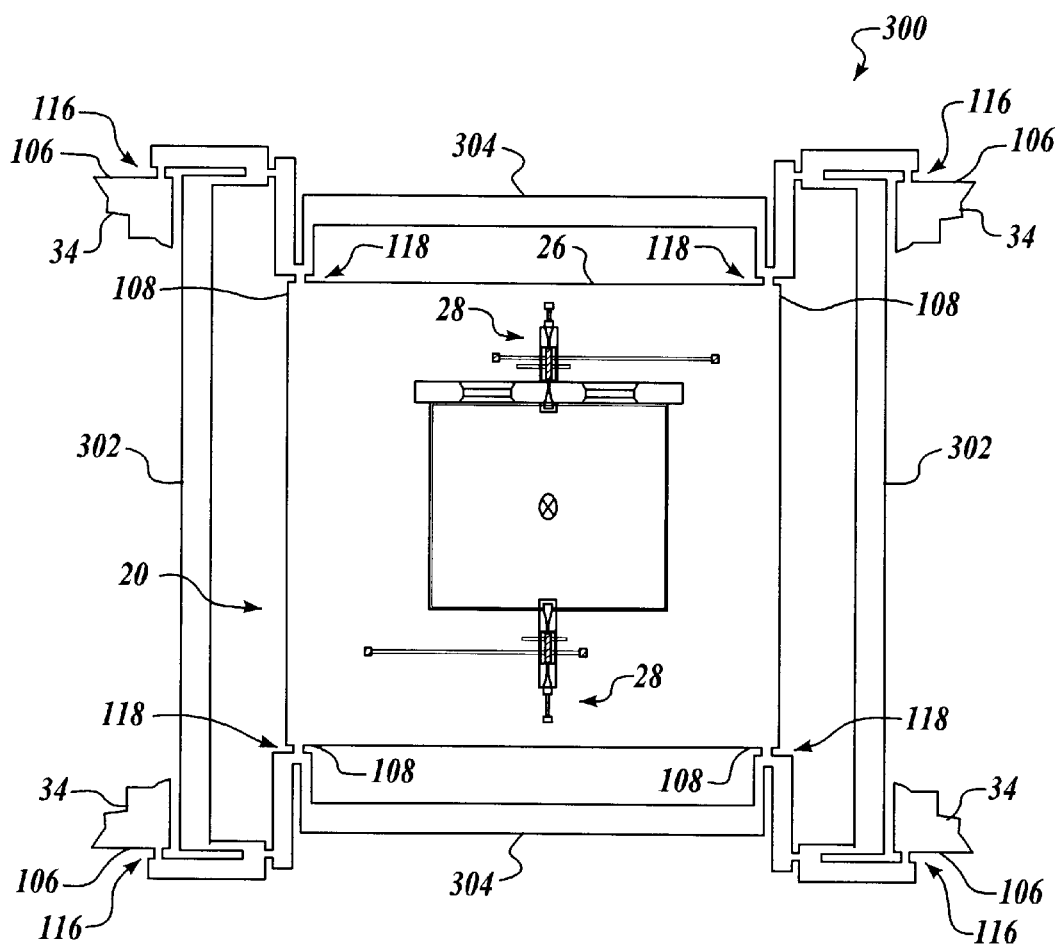
FIG. 7 illustrates the net zero isolator of the invention embodied as a two-axis suspension system or sensor platform for an acceleration sensor mechanism, such as the acceleration sensor mechanism shown in FIG. 1, wherein the sensor plate is mounted on the isolated pads of the two-axis net zero suspension system or sensor platform.

The second net zero isolator 100 is structured similarly to the first net zero isolator 100. The first and second net zero isolators 100 are spaced apart and arranged having the isolated pads 108 of the first isolator 100 facing toward the isolated pads 108 of the second isolator 100. The mounting pads 106 are outside of the two net zero isolators 100 and facing outwardly from them. The two net zero isolators 100 are mounted by their respective mounting pads 106 on a surface (not shown) external to the net zero isolators 100. The isolated pads 108 form attachment points of the sensor platform 200 that are isolated from translational displacements at the mounting pads 106, as described above herein. A device, such as the sensitive acceleration sensor mechanism 20 (shown), is supported on the isolated pads 108. For example, the device 20 is coupled to the isolated pads 108, as shown. Alternatively, the isolated pads 108 are integrated into the device 20, for example, as portions of the sensor plate 26 of the acceleration sensor mechanism 20, as shown in FIG. 7. The embodiment of the sensor platform 200 shown in FIG. 5 is effective in a single axis.

Figure 6:
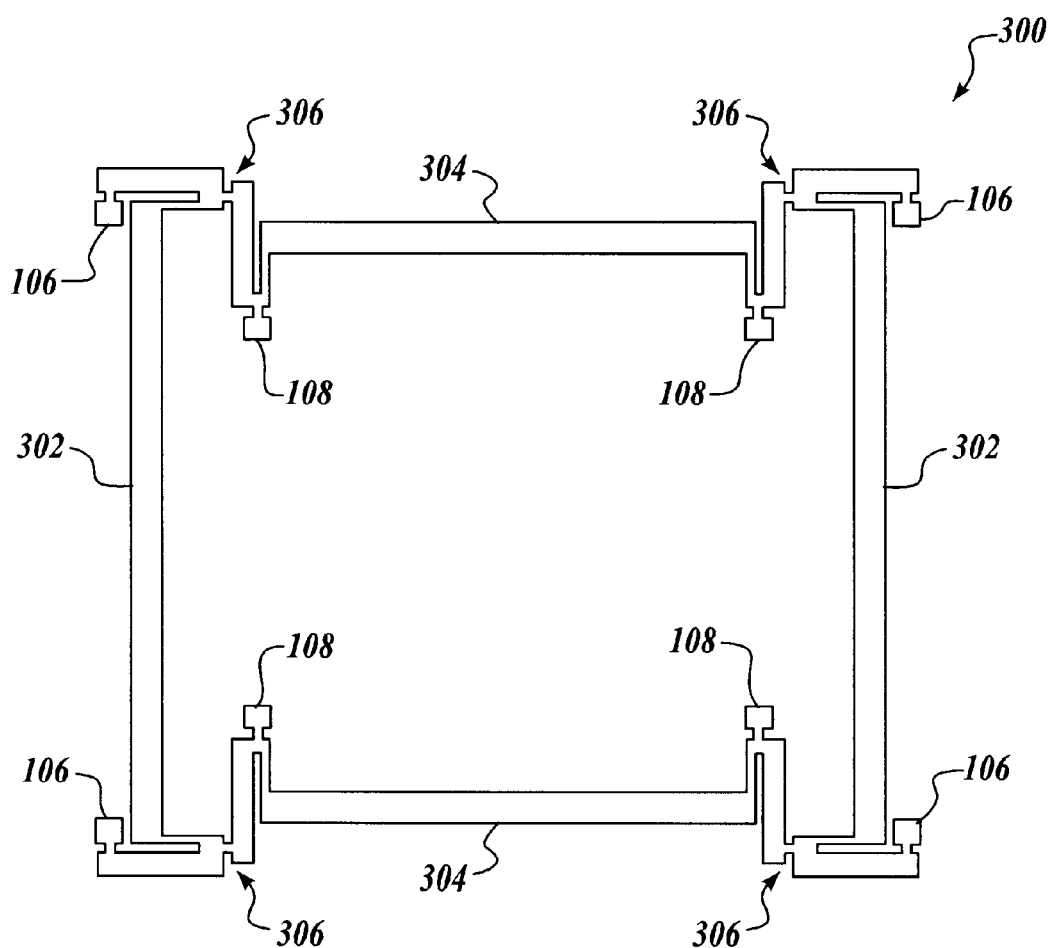
FIG. 6 illustrates the net zero isolator of the invention embodied as an alternative two-axis suspension system or sensor platform.

FIG. 6 illustrates the net zero isolator of the invention embodied as an alternative two-axis suspension system. In FIG. 6 a plurality of orthogonal net zero isolators 100 are combined to provide a stable, two-axis suspension system or sensor platform 300. The two-axis net zero suspension system 300 of the invention is formed of an outer pair 302 and an inner pair 304 of the net zero isolators 100 combined orthogonally. The two pair 302, 304 of net zero isolator 100 are formed integrally having the mounting pads 106 of the inner pair 304 being integral with the isolated pads 108 of the outer pair 302 of net zero isolators 100. The inner and outer pairs 302, 304 of net zero isolators 100 are thus connected by neck portions 306 that are equivalents of the neck portions 116 of the inner mounting pads 106 being combined with the neck portions 118 of the outer isolated pads 108. In other words, the neck portions 306 that join the inner and outer pairs 302, 304 of net zero isolators 100 appear in a plan view (shown in FIG. 3) to be the neck portions 116 of the inner mounting pads 106 overlapping the neck portions 118 of the outer isolated pads 108.

According to the two-axis net zero suspension system 300 embodiment of the invention shown in FIG. 3, the first inner pair 302 of net zero isolators 100 provide four of the mounting pads 106 for mounting on an external accelerometer frame, such as the outer accelerometer frame 34 shown in FIG. 1. The second orthogonal outer pair 304 of net zero isolators 100 provide four isolated pads 108 for mounting an acceleration sensor mechanism, such as but not limited to the sensitive acceleration sensor mechanism 20 shown in FIG. 1.

The embodiment illustrated in FIG. 6 shows support points at four isolated pads 108. Because the four isolated pads 108 of the two-axis net zero suspension system 300 are mutually stable, i.e., the isolated pads 108 do not move relative to each other when the mounting pads 106 are deflected in-plane, the isolated pads 108 are optionally interconnected via beams (not shown) or a plate (shown in FIG. 7) mounted thereon in any fashion without strain to such mounted components. Thus, an acceleration sensor supported within the two-axis net zero suspension system 300 in any desired manner remains completely isolated from strains in the plane of the suspension system 300 induced by stresses originating external to the suspension system 300.

FIG. 7, for example, illustrates the acceleration sensor mechanism 20 shown in FIG. 1 having the sensor plate 26 mounted on the isolated pads 108 of an embodiment of the two-axis net zero suspension system 300. The suspension system 300 is coupled in turn to the cover and mounting plates 30, 32 via the four mounting pads 106. The sensor plate 26 is optionally formed integrally with the net zero isolators 100 of the suspension system 300, the four isolated pads 108 being integral portions of the sensor plate 26. The neck portions 118 are interconnected with mounting points on the sensor plate 26 of the acceleration sensor mechanism 20. The mounted acceleration sensor 20 is optionally integrated with a second outer or external frame, such as the external frame 34 shown in FIG. 1. The neck portions 116 of the mounting pads 106 are interconnected with mounting points on the external frame 34, the mounting pads 106 being integral portions of the external frame 34.

The invention may be embodied in a three-axis net zero suspension system by providing a quantity of the net zero isolators 100 orthogonally to the suspension system 300. The mounting pads 106 of the suspension system 300 are interconnected with the isolated pads 108 on the orthogonal net zero isolators 100 and are optionally formed integrally therewith.

Figure 8:
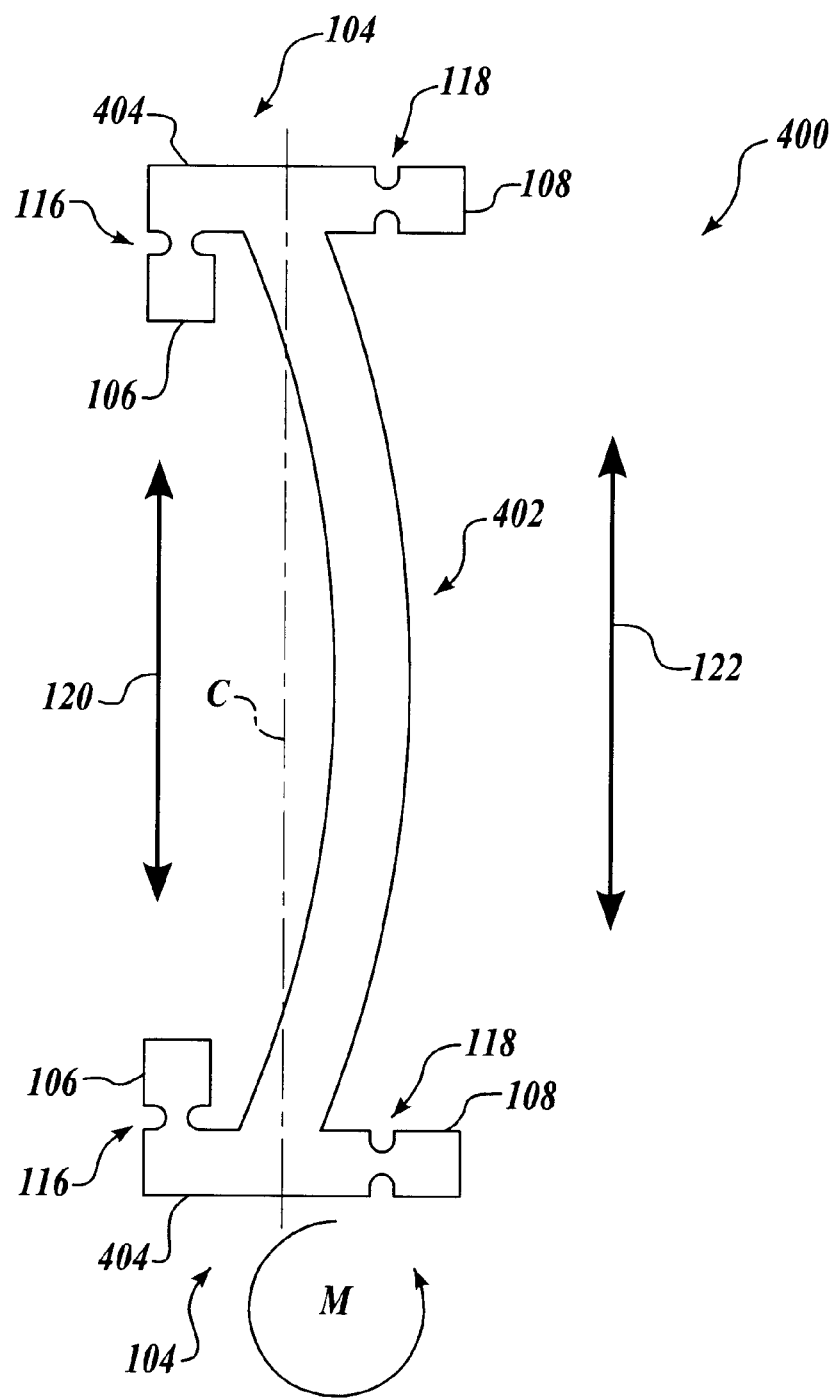
FIG. 8 illustrates the net zero isolator of the invention embodied as a single axis net zero isolator having a simplified configuration relative to the embodiment of FIG. 2.

FIG. 8 illustrates the net zero isolator of the invention embodied as a single axis net zero isolator 400 having a simplified configuration relative to the embodiment of FIG. 2. In the embodiment of FIG. 2, the reaction beam 102 was treated as a substantially rigid beam. However, the substrate material of which the net zero isolator is formed is generally understood to be elastic in nature. The elastic nature of the substrate material permits the features of the net zero isolator of the invention to be embodied in the simplified single axis net zero isolator 400.

The net zero isolator 400 includes a linear displacement member embodied as an elastic curved reaction beam 402. A pair of substantially rigid counter rotation members 104 are mounted integrally at either opposite end of the curved reaction beam 402 and crosswise to a cord C drawn through the opposite ends of the curved reaction beam 402. The counter rotation members 104 are embodied as substantially rigid moment arms 404 that extend crosswise on both sides of the curved reaction beam 402, i.e., toward opposite sides of the cord C. Mounting pads 106 and isolated pads 108 extend from opposite ends of each of the moment arms 404. The mounting pads 106 and isolated pads 108 are spaced away from the respective ends of the rigid moment arms 404 on respective neck portions 116, 118.

An expansive displacement, as indicated by the arrow 120, results in a linear translation force T being applied to the mounting pads 106, which displaces the mounting pads 106 linearly along the length of the reaction beam 402. The linear deflection also causes straightening of the elastic curved reaction beam 402, which moves the isolated pads 108 outwardly away from one another. However, the straightening of the curved reaction beam 402 by the linear translation force T generates the moment M at the ends of the reaction beam 402. The moment M is applied to the moment arms 404 through the mounting pads 106. The moment arms 404 respond to the moment M by rotating about the ends of the reaction beam 402, thereby rotating the isolated pads 108 inwardly. Each of the reaction beam 402 and the moment arms 404 are designed using known mechanical design techniques to have dimensions and compliances that cause the translational deflection 120 of the isolated pads 108 to be equal and opposite the deflection driven by the moment M. In other words, the translational deflection 120 of the isolated pads 108 is cancelled by the rotational deflection driven by the moment M. The summation at the isolated pads 108 of the translational deflection 120 and the deflection driven by the moment M results in a net zero displacement 122 between the pair of isolated pads 108.

The embodiment of the invention illustrated in FIG. 8 is more compact and may be easier to fabricate than the embodiment shown in FIG. 2. The embodiment of FIG. 8 is also easily extended into the stable, two-axis suspension system or sensor platform 300 shown in FIG. 6.

In a MEMS device, such as a micro-machined accelerometer or other sensor device 10 as shown in FIG. 1, the features of the present invention are obtained for essentially no cost because no additional processing is required. However, the invention provides better performance yields and better performance in operation at lower cost than are presently possible.

While the preferred embodiment of the invention has been illustrated and described, it will be appreciated that various changes can be made therein without departing from the spirit and scope of the invention. For example, the linear displacement member 102 and the crosswise counter rotation members 104 are optionally formed having different structures, other than are shown in the Figures, that are also considered equivalent for purposes of practicing the invention. The linear displacement member 102 need only be embodied as floating between a pair of crosswise counter rotation members 104 and arranged adjacent to a first and a second end of the linear displacement member 102, respectively. Each of the first and second counter rotation members 104 are oriented transverse to the linear displacement member 102 and have a mounting portion 106 that extends on a first side of the linear displacement member 102 and an isolated portion 108 that extends on a second side of the linear displacement member 102 opposite from the mounting portion 106. The linear displacement member 102 and the first and second counter rotation members 104 are designed using known mechanical design techniques and structured such that a substantially linear displacement of the mounting portions 106 directed generally along the linear displacement member 102 and in the plane of the substrate generates a moment in each of the first and second counter rotation members 104 that rotates each of the first and second counter rotation members 104 to counter the in-plane linear displacement of the mounting portions 106 at a null point that coincides with the respective isolated portion 108.

What is claimed is:

1. A suspension member, comprising:
   an elongated reaction beam; and
   first and second counter rotation members arranged crosswise to the reaction beam at either end thereof, each of the first and second counter rotation members including a mounting portion spaced apart from an isolated portion on respective first and second sides of the linear displacement member wherein the isolated portions are structured for suspending therefrom a mechanism to be isolated from stresses induced in the mounting portions.

2. The suspension member of claim 1 wherein the reaction beam and the first and second counter rotation members are structured such that a displacement of the mounting portions along the reaction beam is balanced by a deflection of one or more the reaction beam and the first and second counter rotation members.

3. The suspension member of claim 2 wherein the reaction beam further comprises a substantially rigid beam.

4. The suspension member of claim 3 wherein the first and second counter rotation members each include a deflection beam arranged crosswise to the reaction beam and positioned on the second side of the linear displacement member, and a moment arm coupled to the deflection beam at a portion thereof distal from the reaction beam and extending therefrom to the first side of the reaction beam.

5. The suspension member of claim 4 wherein the mounting portion of each counter rotation member is arranged on a portion of the moment arm formed on the first side of the reaction beam.

6. The suspension member of claim 5 wherein the isolated portion of each counter rotation member is arranged on the second side of the reaction beam adjacent to a junction of the moment arm and the deflection beam.

7. The suspension member of claim 2 wherein the reaction beam is structured having an elastic curved portion between the first and second counter rotation members.

8. The suspension member of claim 7 wherein the first and second counter rotation members are substantially rigid members.

9. The suspension member of claim 2 wherein the suspension member comprises a first suspension member; and
   further comprising a second suspension member structured similarly to the first suspension member, the first and second suspension members being spaced apart and arranged having the isolated portions of the first suspension member facing toward the isolated portions of the second suspension member for suspending therebetween a mechanism to be isolated.

10. The suspension member of claim 9, further comprising an acceleration sensor mechanism coupled to the respective isolated portions of the first and second suspension members.

11. The suspension member of claim 9, further comprising third and fourth suspension members being structured similarly to the first suspension member and arranged spaced apart and having the mounting portions of the third suspension member facing oppositely from the mounting portions of the fourth suspension member, each of the mounting portions of the first and second suspension members being coupled to one of the isolated portions of each of the third and fourth suspension members.

12. The suspension member of claim 11 wherein the mounting portions of the first and second suspension members are integrated with the respective isolated portions of the third and fourth suspension members.

13. The suspension member of claim 11, further comprising an acceleration sensor mechanism wherein the isolated portions are integrated with the acceleration sensor mechanism.

14. A suspension member, comprising:
a means for coupling the suspension member to a frame external to the suspension member;
a means for suspending a device that is to be isolated for stresses experienced by the external frame; and
a means for reacting to a displacement of the frame coupling means, the displacement reacting means interconnecting the frame coupling means and the device suspending means such that a displacement of the frame coupling means is cancelled at the device suspending means by a reaction within the displacement reacting means.

15. The suspension member of claim 14 wherein the frame coupling means, the device suspending means, and the displacement reacting means interconnecting the frame coupling means and the device suspending means operate in a plane.

16. The suspension member of claim 15, wherein the displacement reacting means further comprises a reaction element coupled between a pair of crosswise counter rotation elements, the frame coupling means and the device suspending means operating on opposite sides of the reaction element coupled at opposite ends of the counter rotation elements.

17. The suspension member of claim 14 wherein:
the displacement reacting means further comprises first and second means for generating a moment, the first and second moment generating means being arranged on opposite ends of the displacement reacting means and extending on first and second sides of the displacement reacting means;
the means for coupling the suspension member to an external frame further comprises first and second mounting portions being coupled to the first and second moment generating means and arranged on a first side of the displacement reacting means; and
the device suspending means further comprises first device suspending means arranged on the first moment generating means on a second side of the displacement reacting means, and a second device suspending means arranged on the second moment generating means on the second side of the displacement reacting means.

18. The suspension member of claim 17 wherein the reaction within the displacement reacting means that cancels the in-plane displacement of the device suspending means is provided by a moment that acts though the first and second moment generating means.

19. The suspension member of claim 18, further comprising a first pair of the suspension members being spaced apart and arranged with their respective first and second device suspending means being arranged between their respective first and second external frame coupling means.

20. The suspension member of claim 19, further comprising a second pair of the suspension members being spaced apart and arranged with their respective first and second device suspending means being arranged between their respective first and second frame coupling means, the frame coupling means of the second pair of suspension members being interconnected with respective device suspending means of the first pair of suspension members.

21. The suspension member of claim 20 wherein the frame coupling means of the second pair of suspension members are integrated with respective device suspending means of the first pair of suspension members.

22. The suspension member of claim 20, further comprising an acceleration sensor mechanism suspended by the device suspending means of the second pair of suspension members.

23. A net zero isolator, comprising:
an elongated reaction beam formed of a substantially planar substrate; and
a first and a second counter rotation member formed in the substrate and arranged adjacent to a first and a second end of the elongated reaction beam, respectively, each of the first and second counter rotation members being oriented transverse to the elongated reaction beam and having a mounting portion extending on a first side of the reaction beam and an isolated portion extending on a second side of the reaction beam opposite from the mounting portion, the elongated reaction beam and the first and second counter rotation members being structured such that a substantially linear displacement of the mounting portions directed generally along the elongated reaction beam in the plane of the substrate generates a moment in each of the first and second counter rotation members that rotates each of the first and second counter rotation members to counter the in-plane linear displacement of the mounting portions at a null point that coincides with the respective isolated portion.

24. The isolator of claim 23 wherein each of the mounting portions comprises a mounting pad projecting from the respective first and second counter rotation members on the first side of the elongated reaction beam; and
each of the isolated portions comprises an isolated pad projecting from the respective first and second counter rotation members on the second side of the elongated reaction beam opposite from the mounting pad.

25. The isolator of claim 24 wherein each of the first and second counter rotation members comprises:
a deflection beam that projects crosswise from one end of the elongated reaction beam toward the second side of the elongated reaction beam; and
a moment arm that is coupled to the deflection beam at a junction at an end of the deflection beam that is distal from the reaction beam,
the moment arm being doubled back along the respective deflection beam at a position spaced a short distance away therefrom and being extended onto the first side of the elongated reaction beam opposite from the deflection beam.

26. The isolator of claim 24 wherein the elongated reaction beam is structured having an elastic curved portion arranged between the first and second counter rotation members; and
each of the first and second counter rotation members comprises a moment arm that extends on both sides of the curved reaction beam.

27. A two-axis suspension system, comprising:
a first pair of generally planar net zero isolators each having an elongated displacement reaction member floating between a pair of crosswise counter rotation members, the counter rotation members each having a mounting portion extended on a first side of the displacement reaction member and a isolated portion extended on a second side of the displacement reaction member, the linear displacement member and the pair of net zero isolators being structured such that a substantially linear displacement applied to the mounting portions and directed generally along the elongated displacement reaction member in the plane of the net zero isolator generates moments that rotate the counter rotation members to cancel the in-plane linear displacement of the mounting portions at the respective isolated portion, the first pair of net zero isolators spaced apart in a plane with the isolated portions arranged between them and the mounting portions arranged outside them; and a second pair of generally planar net zero isolators each being substantially similar to the first pair and being similarly arranged crosswise to the first pair, the mounting portions at respective first ends of the first pair being coupled to the isolated portions at respective first ends of the second pair, and the mounting portions at respective second ends of the first pair being coupled to the isolated portions at respective second ends of the second pair.

28. The suspension system of claim 27 wherein the first and second pairs of net zero isolators are formed integrally of a single substrate.

29. The suspension system of claim 27 wherein the respective coupled mounting portions and isolated portions are integrated.

30. The suspension system of claim 27 wherein the counter rotation members are structured having a plurality of interconnected beam members.

31. The suspension system of claim 27, further comprising an acceleration sensing mechanism positioned between the first and second pairs of net zero isolators and having a frame portion coupled to the respective isolated portions of the first pair of net zero isolators.

32. The suspension system of claim 31 wherein the respective isolated portions of the first pair of net zero isolators are integrated with the frame portion of the acceleration sensing mechanism.

33. A device suspension means, comprising:
a means for mounting to an external body at a plurality of mounting points that are spaced apart in a substantially planar two-dimensional pattern, the mounting means including a plurality of mounting portions that coincide with the two-dimensional pattern of mounting points; and
an isolating means interconnected to the mounting means for isolating from stresses due to translation of the mounting points a plurality of isolated points that are spaced apart in a substantially planar two-dimensional pattern, the isolating means including a plurality of isolated portions that coincide with the two-dimensional pattern of isolated points and are structured for interconnection to a device to be suspended therefrom.

34. The device suspension means of claim 33 wherein the mounting means form a perimeter within which the isolating means is located.

35. The device suspension means of claim 34 wherein the isolating means acts through a moment arm to generate a displacement of the isolated points that cancels a linear displacement of the mounting means.

36. The device suspension means of claim 35, further comprising a means for sensing acceleration, the acceleration sensing means being interconnected to the isolating means.

37. A method of suspending a device, the method comprising:
suspending a plurality of suspension members to a surface external to the suspension members, each of the suspension members further comprising a respective plurality of mounting portions and isolated portions, wherein suspending the suspension members further comprises:
interconnecting the mounting portions to a surface external to the suspension members, and
suspending the isolated portions from the mounting portions;
suspending a device from the isolated portions; and
acting through a moment arm to generate a displacement within each suspension member that cancels a linear displacement of the mounting portions at the isolated portions.

38. The method of claim 37 wherein suspending a plurality of suspension members further comprises:
suspending one of the isolated portions from a first end of each of a pair of moment arms;
suspending one of the mounting portions from a second end of each of the pair of moment arms; and
suspending the pair of moment arms adjacent to opposite ends of an elongated reaction member with the mounting portions positioned on a first side of the reaction member and the isolated portions positioned on a second side of the reaction member opposite from the mounting portions.

39. The method of claim 37, further comprising suspending the mounting portions of a first subset of the plurality of suspension members from the pairs of isolated portions of a second subset of the suspension members.

40. The method of claim 39, further comprising interconnecting a device to isolated portions of the first subset of suspension members.

41. The method of claim 37, further comprising interconnecting an acceleration sensing device to the isolated portions of the suspension members.

42. An accelerometer comprising:
an outer frame member formed of a monocrystalline silicon substrate having essentially parallel opposing surfaces;
an acceleration sensing mechanism positioned within the outer frame member; and
a plurality of net zero isolators suspending the acceleration sensing mechanism from the outer frame member, each of the net zero isolators comprising:
a pair of spaced apart counter rotation members each including a mounting portion positioned on a first end and coupled to the outer frame member, and an isolated portion positioned on a second end and coupled to the acceleration sensing mechanism, and
a displacement reaction member arranged between the pair of spaced apart counter rotation members, the pair of spaced apart counter rotation members being arranged crosswise to the displacement reaction member and having the mounting portions projected on a first side of the displacement reaction member toward the outer frame member and the isolated portions projected on a second side thereof toward the acceleration sensing mechanism, wherein the displacement reaction member and the interconnected pair of spaced apart counter rotation members are structured such that a linear displacement applied to the mounting portions in alignment with the displacement reaction member is balanced at the isolated portions.

43. The accelerometer of claim 42 wherein the displacement of the mounting portions is balanced by a moment that acts through the counter rotation members.

44. The accelerometer of claim 42 wherein the mounting portion is suspended from the first end of the respective counter rotation member by a flexible neck portion.

45. The accelerometer of claim 44 wherein the mounting portion is integrated with the outer frame member.

46. The accelerometer of claim 42 wherein the isolated portion is suspended from the second end of the respective counter rotation member by a flexible neck portion.

47. The accelerometer of claim 46 wherein the isolated portion is integrated with a portion of the acceleration sensing mechanism.

48. The accelerometer of claim 42 wherein the plurality of net zero isolators suspending the acceleration sensing mechanism from the outer frame member further comprises:
    a first pair of spaced apart net zero isolators having their respective displacement reaction members substantially aligned on opposite sides of the acceleration sensing mechanism, having their respective mounting portions facing outwardly away from the acceleration sensing mechanism and coupled to the outer frame member, and having their respective isolated portions facing inwardly toward but spaced away from the acceleration sensing mechanism; and
    a second pair of spaced apart net zero isolators arranged crosswise to the first pair and having their respective displacement reaction members substantially aligned on opposite ends of the acceleration sensing mechanism, having their respective mounting portions facing outwardly away from the acceleration sensing mechanism and coupled to the respective isolated portions of the first pair of net zero isolators, and having their respective isolated portions facing inwardly toward the acceleration sensing mechanism and coupled to a portion thereof.

49. The acceleration sensor recited in claim 42, further comprising:
    a bottom cover plate;
    a top cover plate; and
    respective first and second opposing surfaces of the outer frame attached to the bottom and top cover plates.

50. An acceleration sensing device comprising:
    a means for sensing acceleration of a body along an input axis; and
    a suspension means for suspending the acceleration sensing means from a body to be accelerated, the suspension means including first mounting means for mounting the suspension means to the body and second mounting means for mounting the acceleration sensing means to the suspension means such that a linear displacement applied to the first mounting means is balanced at the second mounting means by a responsive displacement within the suspension means.

51. The accelerometer of claim 50 wherein the suspension means is structured to balance a linear displacement applied to the first mounting means in alignment with the first mounting means.

52. The accelerometer of claim 50 wherein the suspension means further comprises a moment generating means that is responsive to a displacement of the first mounting means for generating a moment acting through the suspension means to balance the displacement at the second mounting means.

53. The accelerometer of claim 50 wherein the suspension means further comprises a plurality of net zero isolators each comprising a pair of counter rotation members having the first mounting means adjacent to a first end and having the second mounting means adjacent to a second end, the pair of counter rotation members being spaced apart and arranged substantially orthogonally to opposite ends of a displacement reaction member, wherein the pair of counter rotation members and the displacement reaction member are structured such that a linear displacement aligned with the displacement reaction member and applied to the first mounting means is balanced by a responsive deflection of the respective counter rotation members.

54. The accelerometer of claim 53 wherein the suspension means further comprises a pair of the net zero isolators arranged on first and third opposing sides of the acceleration sensing means, the first mounting means of each of the net zero isolators being coupled to the body and the second mounting means of each of the net zero isolators being coupled to the acceleration sensing means.

55. The accelerometer of claim 53 wherein the suspension means further comprises:
    a first pair of the net zero isolators arranged on first and third opposing sides of the acceleration sensing means, the first mounting means of each of the first pair net zero isolators being coupled to the body and the second mounting means of each of the first pair net zero isolators facing away from the acceleration sensing means; and
    a second pair of the net zero isolators arranged crosswise to the first pair of net zero isolators and positioned on second and fourth opposing sides of the acceleration sensing means, the first mounting means of each of the second pair of net zero isolators being coupled to the second mounting means of the respective first pair of the net zero isolators, and the second mounting means of each of the second pair net zero isolators being coupled to the acceleration sensing means.

56. The accelerometer of claim 55, wherein the first mounting means of each of the second pair of net zero isolators are integrated with the second mounting means of the respective first pair of the net zero isolators.

57. The accelerometer of claim 56 wherein the second mounting means of each of the second pair net zero isolators are integrated with a portion of the acceleration sensing means.

58. The accelerometer of claim 57 wherein the first mounting means of each of the first pair net zero isolators are integrated with a portion of the body.

59. A monolithic micro-machined accelerometer having improved shock survivability and external stress de-coupling characteristics, the accelerometer comprising:
    a) an accelerometer mechanism die formed of a first monocrystalline silicon substrate having essentially parallel opposing surfaces, the mechanism die comprising:
        i) an integral outer frame member,
        ii) an integral acceleration sensing mechanism disposed within said outer frame member, and
        iii) a plurality of integral net zero isolators pliantly suspending the acceleration sensing mechanism from the outer frame member, each of the integral net zero isolators comprising a pair of counter rotation members having a mounting pad adjacent to a first end and coupled to the outer frame member and having an isolated pad adjacent to a second end and coupled to the acceleration sensing mechanism, the pair of counter rotation members being spaced apart and arranged substantially orthogonally to opposite ends of a reaction beam, wherein the pair of counter rotation members and the reaction beam are structured such that a linear displacement aligned with the reaction beam and applied to the respective mounting pads is balanced at the respective isolated pads by a responsive deflection of the respective counter rotation members that is generated by a moment that acts through the respective counter rotation members;

b) a top cover plate formed of a second monocrystalline silicon substrate, the top cover plate including a peripheral bond area adhesively bonded to a first surface of the outer frame member; and c) a bottom cover plate formed of a third monocrystalline silicon substrate, the bottom cover plate including a peripheral bond area adhesively bonded to a second surface of the outer frame member opposite from the top cover plate.

60. The accelerometer of claim 59 wherein the plurality of integral net zero isolators further comprises a pair of the net zero isolators arranged on first and third opposing sides of the acceleration sensing mechanism, the mounting pads of each of the net zero isolators being coupled to the outer frame member and the isolated pads of each of the net zero isolators being coupled to the acceleration sensing mechanism.

61. The accelerometer of claim 59 wherein each of the plurality of integral net zero isolators further comprises:

a first pair of the net zero isolators arranged on first and third opposing sides of the acceleration sensing mechanism, a pair of mounting pads of each of the first pair net zero isolators being coupled to the outer frame member and the isolated pads of each of the first pair net zero isolators facing away from the acceleration sensing mechanism; and a second pair of the net zero isolators arranged crosswise to the first pair of net zero isolators and positioned on second and fourth opposing sides of the acceleration sensing mechanism, the mounting pads of each of the second pair of net zero isolators being coupled to the isolated pads of the respective first pair of the net zero isolators, and the isolated pads of each of the second pair net zero isolators being coupled to the acceleration sensing mechanism.

62. The accelerometer recited in claim 59, wherein said acceleration sensing mechanism further comprises:

an accelerometer frame member;

a proof mass suspended from said accelerometer frame member by one or more flexures; and one or more mechanical resonators extending between said accelerometer frame member and said proof mass.

* * * * *